No. 867,238. PATENTED OCT. 1, 1907.
L. BORSUM.
PHOTOGRAPHIC CAMERA.
APPLICATION FILED DEC. 8, 1905.
2 SHEETS—SHEET 1.
Fig. 1,
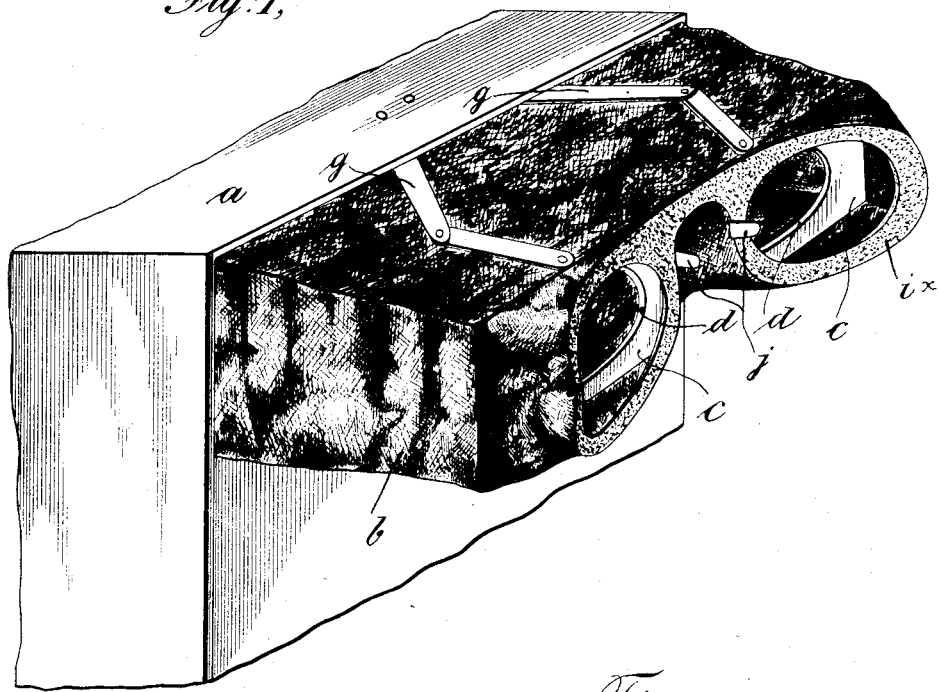
Fig. 2,
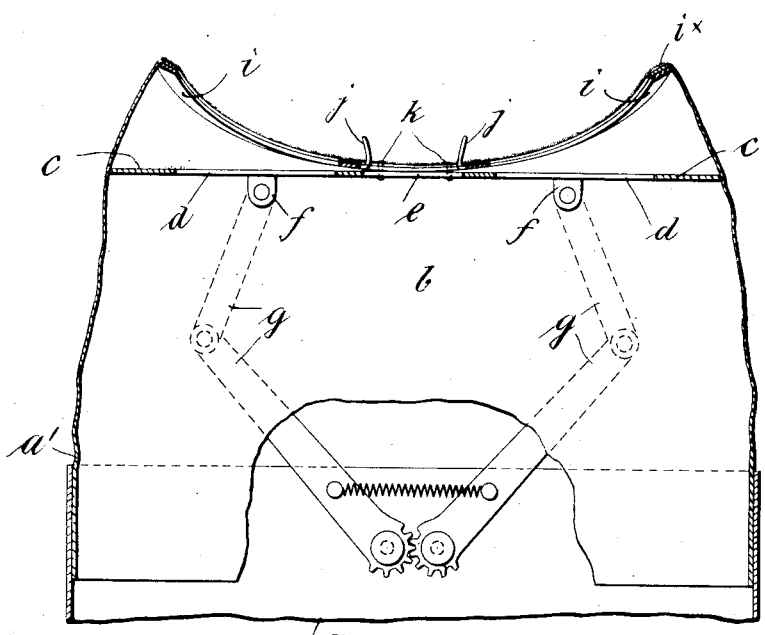
Witnesses
Max B. A. Doring.
L. F. Browning.
Inventor
Louis Borsum
By his Attorney
Edward C. Davidson No. 867,238. PATENTED OCT. 1, 1907.
L. BORSUM.
PHOTOGRAPHIC CAMERA.
APPLICATION FILED DEC. 8, 1905.
2 SHEETS—SHEET 2.
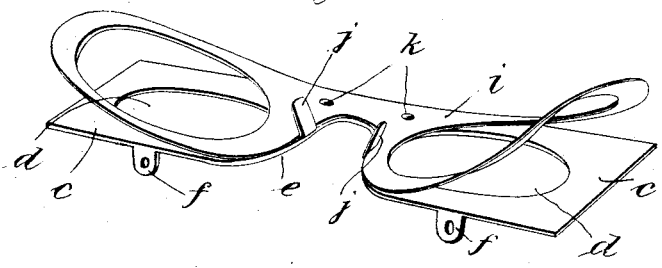
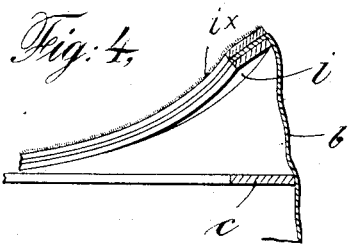
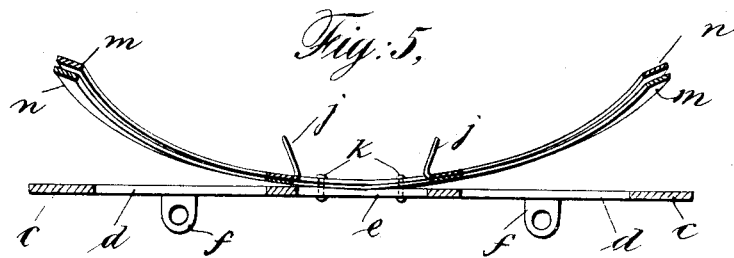
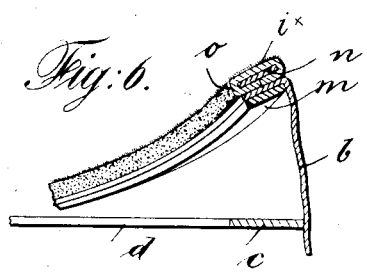
Witnesses
Max B. A. Doring
L. F. Browning
Inventor
Louis Borsum
By his Attorney
Edward C. Davidson

UNITED STATES PATENT OFFICE.

LOUIS BORSUM, OF PLAINFIELD, NEW JERSEY.

PHOTOGRAPHIC CAMERA.

No. 867,238.  Specification of Letters Patent.  Patented Oct. 1, 1907.

Application filed December 8, 1905. Serial No. 290,916.

*To all whom it may concern:*

Be it known that I, LOUIS BORSUM, a citizen of the United States of America, residing at Plainfield, county of Union, State of New Jersey, have invented certain new and useful Improvements in Photographic Cameras, of which the following is a specification.

This invention comprises an arrangement of eye pieces, through which an operator may observe the focused image, particularly adapted for use in cameras such as shown in my U. S. Letters Patent No. 741,102, dated October 13, 1903. The eye pieces are collapsible and extensible, being foldable within a cavity in the camera box. Some, or all, of the features of the present invention are, however, applicable to cameras of other arrangement; and may be employed in cameras constructed and operating as shown in my application for Letters Patent filed October 4, 1905, Serial No. 281,272.

The construction and operation of the devices are hereinafter fully set forth.

In the accompanying drawings: Figure 1, is a perspective view: Fig. 2, a cross-section: Fig. 3, a view showing the outer plates to which the operating links and bellows are attached: Fig. 4, a detail sectional view showing the manner of applying the bellows and outer covering to the outer metal parts: Fig. 5, a detail longitudinal section showing a modification: and Fig. 6, a detail sectional view illustrating a manner of applying the outer covering and bellows.

The box $a$ represents a chamber within a camera box such as that disclosed in my Patent No. 741,102.

The hood $b$ is attached at its inner end around the opening $a'$ in the back of the box or chamber; and is attached at its other end to the eye pieces, which comprise a plate $c$ formed with observation apertures $d$, $d$, and a central recess $e$ on one side to accommodate the bridge of the nose of the observer. On each side of the recess $e$ and connected to opposite edges of the plate $c$ are links $f, f$ jointed at their inner ends to pivoted arms $g, g$ respectively formed with concentric rack teeth that intermesh. A coiled spring having its ends connected to the respective arms $g, g$, behind or outside of the axes of the arms acts when the latter are drawn out to hold them so extended. When, however, plate $c$ is pressed inwardly, the arms $g$ rock about their axes, folding into the box to such extent that the spring passes beyond or inside of their axes and therefore tends to hold them in folded or collapsed position within the box. To extend such a structure it is only necessary to pull it out and the spring acts to retain it in extended position. By slight pressure it may be collapsed within the box and the springs tend to retain it in collapsed position.

On the plate $c$ is attached a curved spring plate $i$ cut away to conform to the nose bridge opening $e$ and provided with apertures overlying and preferably of somewhat larger dimensions than the apertures $d$ in plate $c$. The plate $i$ has somewhat the appearance of a pair of eye glasses but is curved and is elastic being preferably made of sheet steel and the ends thereof normally spring away from the ends of plate $c$. In Fig. 4, the collapsible hood is attached around the edges of the eye piece $i$ whose outer faces are preferably covered with plush, velvet, or other suitable soft long pile light-excluding material $i^X$. The plate $i$ has on opposite sides of the nose bridge recess, outwardly extending hook like projections $j$, that serve to receive and retain the eye glasses of the operator, which may be readily removed and therefore may be applied only when desired, or may be allowed to remain, so that the device may always be ready for his use. The piece $i$ is attached to the plate $c$ by suitable rivets $k$.

Figs. 5 and 6 show a modification consisting in making the eye piece $i$ in duplicate,—that is, in two layers one superposed upon the other and both attached to plate $c$ by the same rivets $k$. In this figure, the plates are respectively lettered $m$ and $n$. They are of the same contour and construction except that the outer one $n$ only has the eye-glass hooks $j$. The edges of the hood are applied to the inner plate $m$ being brought up around its edges and over its outer face and cemented or otherwise secured thereto. The outer plate $n$ is covered with velvet, plush or other suitable material, preferably with long soft pile, upon its outer face and the material is carried around over the edges and against the under face as seen at $o$. The resilience of the two plates $m$, $n$ is such that they tend to lie close together and contact of the material of the hood disposed on the outer face of the under plate $m$ and of the material covering the outer plate and disposed upon its under face is sufficient to exclude light. This arrangement is a convenient and satisfactory one in use and also possesses substantial advantages incident to manufacture.

I claim as my invention:

1. An eye piece device for a photographic camera provided with means for attachment of the eye glasses of the operator.

2. An eye piece device for a photographic camera comprising a plate $c$, having observation apertures and a recess for the bridge of the nose of the operator, and a curved yielding plate attached to the plate $c$ and having corresponding apertures and recess.

3. An eye piece device for a photographic camera comprising the combination of an eye piece frame having observation apertures and a recess for the bridge of the nose of the operator, two like superposed curved spring plates attached thereto having a corresponding recess and apertures, a hood having its outer edge attached to the inner one of such spring plates and a covering of soft light-excluding material applied to the outer one.

4. An eye piece device for a photographic camera, comprising a yielding spring plate centrally supported, having in each end an observation aperture, and being outwardly curved at each end.

5. An eye piece device for a photographic camera, comprising an outer spring-yielding part whose ends are provided with observation apertures and are outwardly curved to approximate the contour of the face of the operator.

6. An eye piece device for a photographic camera, comprising two like spring-supported parts, one for each eye of the operator, each capable of yielding inwardly.

In testimony whereof, I have hereunto subscribed my name.

LOUIS BORSUM.

Witnesses:
L. F. BROWNING,
E. F. WICKS.